Aug. 1, 1961     H. E. MORROW     2,994,186
METHOD OF MAKING LINK PLATES FOR CHAIN
Filed Sept. 11, 1958
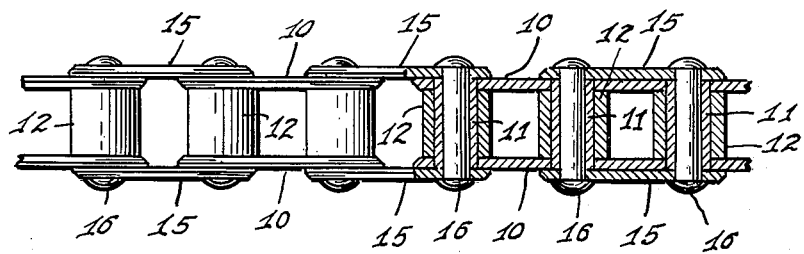
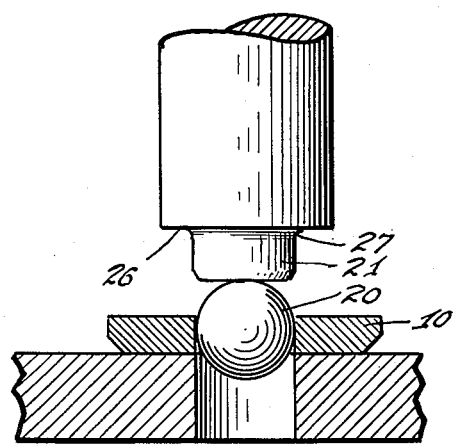
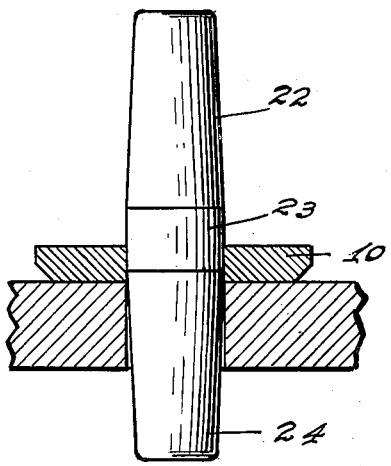
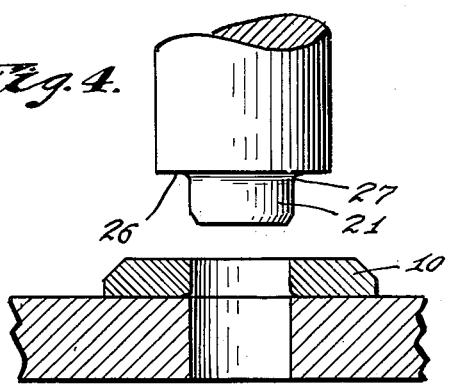
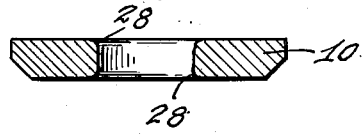
INVENTOR.
HARRY E. MORROW,
BY
ATTORNEYS.

United States Patent Office 2,994,186
Patented Aug. 1, 1961

2,994,186
METHOD OF MAKING LINK PLATES FOR CHAIN
Harry E. Morrow, Indianapolis, Ind., assignor to Diamond Chain Company, Inc., Indianapolis, Ind., a corporation of Indiana
Filed Sept. 11, 1958, Ser. No. 760,329
3 Claims. (Cl. 59—8)

This invention relates to a method of manufacturing the link plates of power-transmitting chain whereby the durability of the chain, and especially the fatigue resistance of the link plates, is substantially increased. It has heretofore been recognized, in United States Patent No. 2,424,087, to Focke et al., that the fatigue resistance of the link plates of power transmitting chain could be increased by the use of exceptionally tight press-fits of pins or bushings in the pitch holes of the plates. Such tight fits created in the link plates substantial internal stresses the presence of which was believed responsible for the enhanced fatigue resistance. The Focke et al. patent also disclosed the preliminary drifting of the pitch holes and the cold-coining of at least one edge of each hole. As the Focke et al. invention was practiced in the quantity production of chain, the drifting of the pitch holes and the cold-coining of their edges was performed before any heat treatment to which the link plates were subjected prior to being assembled into the chain.

I have now discovered that the fatigue resistance of heat-treated link plates and similar chain elements can be still further enhanced by use of a method wherein the pitch holes of such elements are drifted before the elements are heat-treated and then are redrifted after the heat treatment. One or both edges of each pitch hole may be cold-coined after the heat-treating operation to produce an even greater increase in fatigue resistance.

Other features of the invention will become obvious from the following more detailed description and from the accompanying drawings, in which:

FIG. 1 is a plan view of a roller chain in partial section;

FIG. 2 is a sectional view illustrating an operation in which a pitch hole of a link plate is drifted by a hardened ball;

FIG. 3 is a view similar to FIG. 2 illustrating the drifting of a link plate with a drift pin;

FIG. 4 is a sectional view illustrating the operation of cold-coining an edge of a pitch hole in a link plate; and FIG. 5 is a section through a link plate the pitch hole of which has been finished in the preferred manner.

The chain illustrated in FIG. 1 is a conventional roller chain consisting of a series of alternating inner and outer, pivotally interconnected links. Each inner link comprises a pair of spaced link plates 10 having adjacent their ends pitch-holes which receive bushings 11 with a press fit. Rollers 12 are rotatably mounted on bushings 11 between the link plates 10. Each outer link comprises a pair of spaced link plates 15 having at their ends pitch holes which receive pins 16. The pins 16 are rotatably received within the bushings 11 of inner links, but are received with a press fit in the link plates 15 of the outer links.

As previously indicated, this invention is concerned with the finishing of the pitch holes in the link plates 10 and 15 to improve the fatigue resistance of such link plates. The pitch holes in the link plates of the chain are commonly formed by a piercing operation followed by shaving. As disclosed in the aforesaid Focke et al. patent, the fatigue resistance of link plates having holes so formed can be substantially improved by forcing an appropriate drift through the hole. In practicing the invention of Focke et al., such drifting operation was always carried out before any heat treatment to which the link plate was subjected. Since the metal was therefore relatively soft, it was capable of flowing to some extent during the drifting operation, thus smoothing the hole-surface and closing minute cracks which might develop into fatigue fractures under conditions of use. In addition, the drifting operation promoted uniformity in the size and circularity of the pitch holes. Further, the drifting operation created internal stresses in the metal of the link plates; but such internal stresses were largely dissipated or eliminated in subsequent heat treatment.

In my present process, I employ as a first step the drifting operation contemplated by the Focke et al. patent. In FIG. 2, I have shown a pitch hole of a link plate 10 being drifted by a hardened, accurately sized ball 20, which is forced through the hole in the link plate by a punch 21. Instead of using a ball as the drift, I may use (FIG. 3) a hardened pin 22 having an accurately sized, cylindrical mid-portion 23 and tapered end portions 24.

After the pitch holes of the link plates have been drifted, to produce the effects above noted, they are subjected to conventional heat treatment to improve their strength. In accordance with my present invention, the heat treatment is followed by a second drifting operation, which may be performed with the same equipment employed in the first drifting operation. Such redrifting of the pitch holes after heat treatment has several advantageous effects in that it reintroduces internal stresses relieved by the heat treatment, increases the density of the metal adjacent the pitchhole wall, and corrects for any change in pitch hole size or shape that occurred during the heat treatment. Each of these effects contributes significantly to improved fatigue resistance.

Both because the elasticity of the metal causes some contraction of the pitch holes after passage of the drift therethrough and because heat treatment ordinarily results in a slight further contraction, it is usually possible to use in the second drifting operation the same drifts that were used in the first. In some cases, however, it may be desirable to employ in the second operation drifts somewhat larger than those used in the first drifting. For the first drifting, the drifts should have a diameter a few thousandths of an inch larger than the largest diameter of the holes through which they are to be forced. If the drifts used in the second drifting are larger than those used in the first, they are desirably larger by no more than about one thousandth of an inch. It will be understood that the term "drifting" as used herein always implies that the drift is larger than the hole through which it is forced.

In addition to redrifting of the link plates, I have found it advantageous to cold-coin the edges of the pitch holes therein in order to round such edges. Cold-coining of the pitch-hole edges was disclosed in the aforesaid Focke et al. patent but, like the drifting operation, such coining was always performed in practice prior to heat treatment. Further, the principal purpose contemplated by Focke et al. for the cold-coining operation had to do with the production of a chamfer facilitating introduction into the pitch hole of the pin 16 or bushing 11 which it was to receive, and hence Focke et al. were primarily concerned with cold-coining on that side of the link plate from which the pin or bushing enters during assembly of the link. I have found that the cold-coining of pitch-hole edges not only facilitates assembly but also produces a further increase in the fatigue resistance of the link plates, especially when performed at both ends of the pitch hole and in combination with hole drifting.

The chamfering of the pitch-hole edges may be conveniently effected by the same punch 21 used to force the drift through the link plate in the redrifting operation which follows heat treatment. For this purpose, the punch 21 has an enlarged upper portion providing a shoulder 26 formed with a fillet 27 at its junction with the lower portion of the punch. In the redrifting operation, the punch is forced downwardly far enough to cause the fillet 27 to engage the edge of the pitch hole and chamfer it as indicated somewhat exaggeratedly at 28 in FIG. 5. After the combined redrifting and cold-coining operation performed by lowering the punch shown in FIG. 2, each link plate is inverted, as shown in FIG. 4, and the punch is inserted into the pitch hole and forced downwardly far enough to cause the fillet 27 to cold-coin and chamfer the other pitch-hole edge.

Link plates treated in the manner above described are assembled into chain in any desired fashion. Desirably, the press fits of the bushings and pins in the pitch holes have the relatively great tightness described in the Focke et al. patent. The redrifting operation performed in accordance with my invention not only produces directly an improved fatigue resistance in the link plates but also aids materially in providing the extremely tight fits which contribute to a further enhancement of fatigue resistance in the link plates but also aids materially in providing the extremely tight fits which contribute to a further enhancement of fatigue resistance of the link plates in the assembled chain.

I claim as my invention:

1. In the process of producing a steel chain link-plate having spaced pitch holes, the steps of drifting such pitch holes to enlarge them and smooth their surfaces, heat-treating the link-plate, and then redrifting the pitch holes.

2. A process as set forth in claim 1 with the additional step of cold-coining one edge of each pitch hole to chamfer such edge, such cold-coining being performed after the link-plate has been heat-treated.

3. A process as set forth in claim 1 with the additional step of cold-coining both edges of each pitch hole to chamfer such edge, such cold-coining being performed after the link-plate has been heat-treated.

References Cited in the file of this patent

UNITED STATES PATENTS

| | | |
|---|---|---|
| 1,360,558 | Mattsson | Nov. 30, 1920 |
| 1,466,953 | Loomis | Sept. 4, 1923 |
| 2,018,392 | Willink | Oct. 22, 1935 |
| 2,424,087 | Focke et al. | July 15, 1947 |
| 2,778,094 | Whitney | Jan. 22, 1957 |

UNITED STATES PATENT OFFICE
CERTIFICATION OF CORRECTION

Patent No. 2,994,186                          August 1, 1961

Harry E. Morrow

It is hereby certified that error appears in the above numbered patent requiring correction and that the said Letters Patent should read as corrected below.

Column 3, lines 22 and 23, strike out "in the link plates but also aids materially in providing the extermely tight fits which contribute to a further en-"; column 4, line 1, strike out, "hancement of fatigue resistance"; same column 4, lines 4 to 7, claim 1 should appear as shown below instead of as in the patent:

> 1. In the process of producing a steel chain link-plate having spaced pitch holes, the steps of cold-drifting such pitch holes to enlarge them and smooth their surfaces, thereafter heat-treating the link-plate to increase its tensil strength, and then cold-drifting the pitch holes again to reintroduce into the metal surrounding them any internal stresses relieved as an incident to the heat-treating step, whereby to produce a link-plate characterized by the augmented strength resulting from the heat-treating and by the presence of internal stresses in the metal surrounding the pitch holes.

Signed and sealed this 9th day of Januray 1962.

(SEAL)
Attest:

ERNEST W. SWIDER                                   DAVID L. LADD
Attesting Officer                               Commissioner of Patent